United States Patent [19]

Ford

[11] Patent Number: 4,610,395
[45] Date of Patent: Sep. 9, 1986

[54] PROCESS FOR PRODUCING PARTICULATE PIGMENT HAVING IMPROVED TINCTORIAL CHARACTERISTICS

[76] Inventor: James A. Ford, 521 Morris La., Hinsdale, Ill. 60521

[21] Appl. No.: 583,660

[22] Filed: Feb. 27, 1984

[51] Int. Cl.$^4$ ............................................. B02C 19/06
[52] U.S. Cl. ........................................ 241/5; 241/18; 241/25; 241/40; 241/152 R
[58] Field of Search .................. 241/40, 57, 80, 152 R, 241/5, 18, 25

[56] References Cited

U.S. PATENT DOCUMENTS

| | | | |
|---|---|---|---|
| 253,344 | 2/1882 | Chichester | 241/40 |
| 2,032,827 | 3/1936 | Andrews | 83/46 |
| 2,448,049 | 3/1948 | Rafton | 241/136 |
| 2,487,088 | 11/1949 | Andrews | 241/40 |
| 2,857,400 | 10/1958 | Cooper | 260/246 |
| 2,982,666 | 5/1961 | Chun et al. | 160/308 |
| 3,173,620 | 3/1965 | Hunt | 241/284 |
| 3,341,134 | 9/1967 | Meloy | 241/5 |
| 3,837,583 | 9/1974 | Kugelberg et al. | 241/39 |
| 3,840,188 | 10/1974 | Coombe et al. | 241/39 |
| 3,853,274 | 12/1974 | Wright et al. | 241/40 |

OTHER PUBLICATIONS

Product brochure for "Micro-Jets" Fluid Energy Mills; Fluid Energy Processing and Equipment Company, Hatfield, Pennsylvania (5 pages).
Product brochure for "Jet-O-Mizers" Fluid Energy Mills; Fluid Energy Processing and Equipment Company, Hatfield, Pennsylvania (6 pages; Bulletin MI).
*Chemical Engineers' Handbook*, R. H. Perry, C. H. Chilton; pp. 8-43, 8-44, fifth edition, 1973.

*Primary Examiner*—Mark Rosenbaum
*Assistant Examiner*—Timothy V. Eley
*Attorney, Agent, or Firm*—Dressler, Goldsmith, Shore, Sutker & Milnamow, Ltd.

[57] ABSTRACT

A process and apparatus are disclosed for treatment of crystalline, particulate phthalocyanine pigments, and particularly for green shade phthalocyanine blue pigments. To effect development of the pigment tinctorial strength by reduction of the pigment particle size, the pigment particles are repeatedly impacted against relatively fixed impact plates by entrainment in moving air streams. Repeated impacting of the particulate pigment provides significant reduction in its particle size and significant development of the tinctorial strength of the pigment. It is presently preferred that the impacting steps be carried out in conjunction with subsequent viscous grinding of the partially developed pigment. This combination of treatment steps has been found to provide a resultant product of significantly enhanced tinctorial strength, while at the same time affording significant savings in materials, process time, and energy usage.

27 Claims, 4 Drawing Figures

PROCESS FOR PRODUCING PARTICULATE PIGMENT HAVING IMPROVED TINCTORIAL CHARACTERISTICS

TECHNICAL FIELD

The present invention relates generally to arrangements for treating particulate pigments for subsequent production of printing ink and like media, and more particularly to a process and apparatus for enhancing the tinctorial characteristics of particulate phthalocyanine pigments by reduction of the pigment particle size through a series of particle-impacting steps.

BACKGROUND OF THE INVENTION

Phthalocyanine pigments are widely used for the production of printing inks. In their crude form, such pigments are in a crystalline, particulate state, with the individual crystals having a generally elongated, needle-like configuration. In the case of so-called crude green shade phthalocyanine blue, the crude pigment employed for production of blue-shaded inks, the crude pigment particles typically have dimensions on the order of approximately 3 microns by 40 microns.

In its crude form, phthalocyanine pigments do not have the requisite strength or color value needed for the production of printing media. The crude pigment must therefore be "developed" by significantly reducing the particle size to bring out the desired color characteristics and strength of the pigment. In the industry, this development is referred to as being effected by changing the crude pigment from its "alpha" state to its "beta" state wherein the particle size is significantly reduced. When this "flop" in the pigment state is effected, particle size is preferably on the order of 0.4 microns or less (with the particles being roughly spherical), although size reduction to a minimum of one micron or less can be satisfactory.

The most commonly employed technique for effecting the desired reduction in phthalocyanine pigment particle size involves the viscous grinding of crude phthalocyanine particles. The crude pigment particles are combined with a grinding medium, typically comprising microsized sodium chloride salt, in a large double-arm mixing device. Diethylene glycol is also combined so as to create an amorphous, viscous mass, with the glycol also used for controlling the temperature of the mass during grinding. Relatively large amounts of salt are used in the process, typically on the order of 5.7-to-1 to 8-to-1 parts of salt to crude pigment, by weight. The amount of glycol typically employed is on the order of 1.4-to-1, glycol to crude pigment by weight.

The mass thus formed is mixed in the grinding device for an extended period of time, typically on the order of 8 to 10 hours. After viscous grinding in this manner, the conventionally acceptable desired reduction in the particle size of the pigment has been effected, with the resultant mass referred to as "magma". The magma is then combined with large quantities of water to form a slurry and transferred to a boiling tank. Hydrochloric acid is added to dissolve the impurities in the pigment, with the mixture boiled at approximately 90 degrees centigrade for about one and one half hours.

The slurry is then pumped into a filter press which captures the pigment particles and allows the water carrying the dissolved salt and glycol to pass through for disposal. In conventional processes, this step takes approximately two and one-half hours. The filter press is then backwashed for a period of approximately 4 to 7 hours, depending upon the quantity of salt originally employed in the grinding process. The filter press is then emptied and the resultant "press cake" of finished pigment is emptied having a content of approximately 35 percent pigment and 65 percent water.

While the above-described process has been almost universally employed for years for production of refined or developed phthalocyanine pigments, the shortcomings of the process will be readily appreciated. Relatively large amounts of both salt and glycol are required for the viscous grinding, with the grinding itself being both time-consuming and energy-intensive. Because of the relatively large amounts of salt used, the filtering and backwashing steps are also time-consuming, requiring relatively large quantities of fresh water. While the resultant pigment product is of a quality which has found acceptance by the printing industry, testing during the development of the present invention has shown that the resultant pigment is "underdeveloped", and that its full tinctorial characteristics have not been realized.

SUMMARY OF THE INVENTION

The present invention contemplates a process and apparatus for enhancing the tinctorial characteristics of particulate pigments, and has been found to be particularly effective for treating crude green shade phthalocyanine blue pigment. In accordance with invention, reduction of the particle size of the pigment for development of its tinctorial characteristics is effected by a series of impacting steps wherein the particulate pigment is directed at high velocity against an impact plate. By effecting repeated impacting of the pigment particles, significant development of the pigment takes place by reduction of its particle size. Notably, testing has shown that heretofore unachievable development of the crude pigment can be obtained by a combination of particle-impacting and substantially modified viscous grinding. This combination of steps permits the amount of viscous grinding required to be very significantly reduced in comparison to conventional processes, and also permits significantly reduced quantities of grinding salt and glycol to be employed. The result is a pigment product of enhanced tinctorial strength and improved color characteristics which can be obtained with significantly reduced time and expense.

The present process for treating particulate pigment starts with providing a supply of the pigment, which is generally in a bagged, bulk crystalline form. The process further includes entraining the particulate pigment in a gaseous stream preferably comprising pressurized air to form a stream of the particles. The apparatus of the present invention includes an entraining nozzle assembly for imparting fluid energy to the particulate pigment and for propelling the pigment at a high speed.

The gaseous stream and particulate pigment entrained therein are directed in a substantially linear path against an impact plate positioned within a containment comprising a substantially closed impact vessel. The high speed impingement of the pigment particles against the impact plate effects reduction in the pigment particle size of at least some of the particles by the creation of internal stresses which shatter, fragment and pulverize the pigment crystals. In the preferred form of the invention, the centerline of the entraining nozzle assembly is arranged at an acute angle to the impact surface of the impact plate, with the impact surface preferably being irregular and having a stepped configuration.

After impact against the impact plate, the pigment particles fall by gravity to the bottom of the impact vessel as a mass, from where they are collected and conveyed to the entraining nozzle assembly of another impact unit. The entraining, directing, impacting and collecting steps of the process are then repeated for effecting further reduction in the pigment particle size until a finally reduced mass of particles is obtained. It is contemplated that a plurality of the impact units are provided arranged in series, with the number of impact units being on the order of ten. The number of times which the impacting step is repeated can be varied depending upon the desired results. It is envisioned that impacting will be repeated at least about five times on crude green shade phthalocyanine blue when using air entrainment at about 80-100 pounds per square inch. Testing has shown that repeating the impacting steps on the order of ten times provides optimal results, with further repetition not necessarily providing meaningful further pigment particle size reduction.

As noted, practice of the present invention in connection with development of phthalocyanine pigments preferably includes some viscous grinding of the particulate pigment after the particle size has been reduced through the series of impact steps. The finally reduced mass of particulate pigment is ground in the presence of a particulate grinding medium, preferably comprising microsized salt, to which glycol is added so as to form an amorphous mass. While this viscous grinding has been found to effect further reduction of pigment particle size, it is important to note that very significantly reduced quantities of salt and glycol are employed in comparison with conventional crude pigment development by viscous grinding. Additionally, viscous grinding is performed for a significantly reduced time period in comparison to conventional processes, thus further contributing to the savings that can be achieved by employment of the present process.

After grinding, a slurry is formed from the amorphous mass by the addition of water and the pH value of the slurry is lowered by the addition of acid. The resultant mixture is then boiled, after which the mixture is filtered. Because of the significantly reduced quantities of salt and glycol used during the viscous grinding step, filtering of the mixture is greatly simplified, requiring much less time and water than has been conventionally required.

Numerous other advantages and features of the present invention will become readily apparent from the following detailed description, the accompanying drawings, and the appended claims.

DETAILED DESCRIPTION

Figure 1:
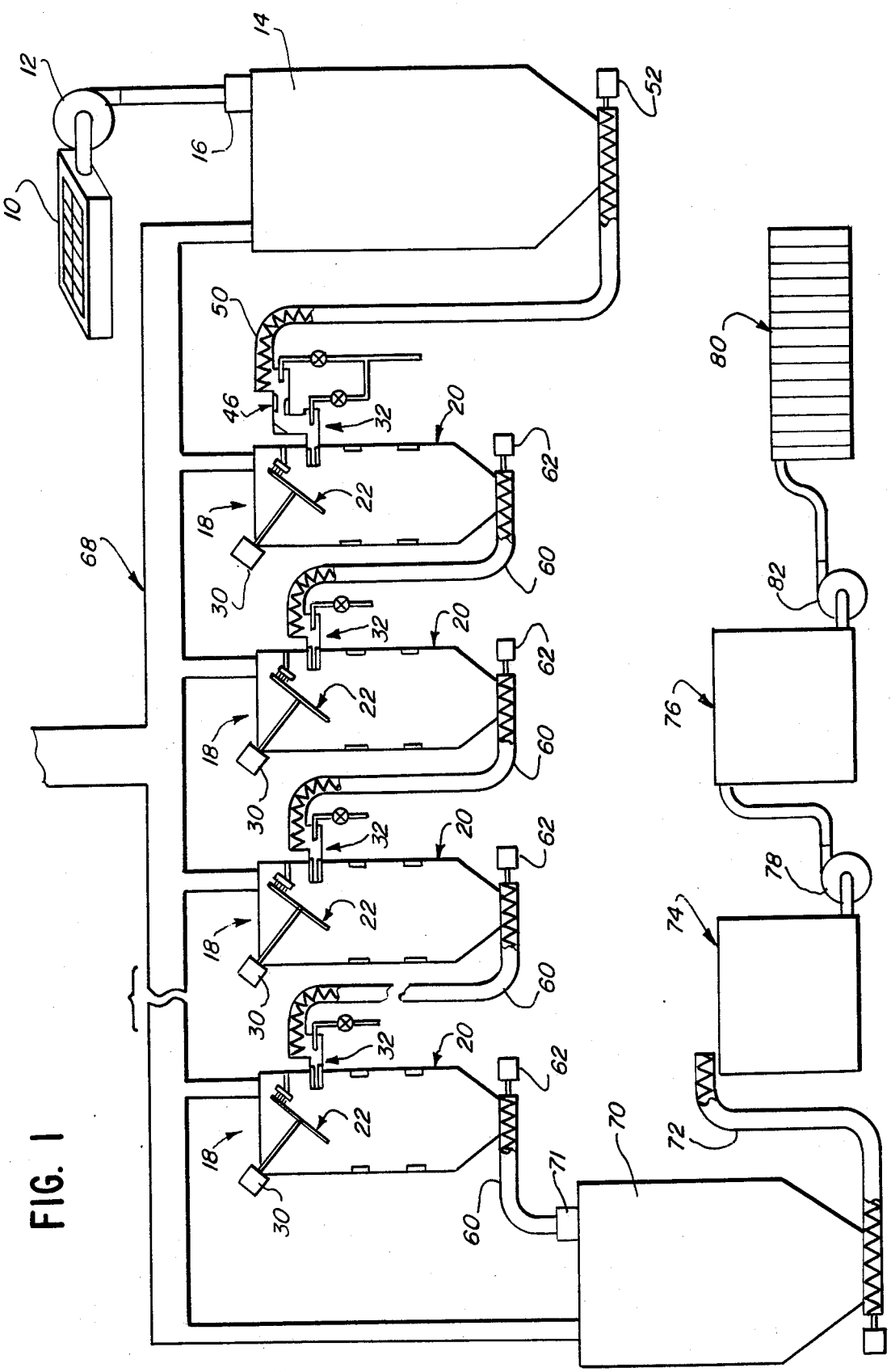
FIG. 1 is a diagrammatic view illustrating a particulate pigment treatment process and apparatus which embody the principles of the present invention.

While the present invention is susceptible of embodiment in various forms, there is shown in the drawings and will hereinafter be described a presently preferred embodiment of the invention, with the understanding that the present disclosure is considered as an exemplification of invention and is not intended to limit the invention to the specific embodiment illustrated and described.

For purposes of the present disclosure, the present process and apparatus will be described in connection with the development of crude green shade phthalocyanine blue, referred to generally herein as "particulate pigment". As will be appreciated by those familiar with the art, the present process and apparatus are readily adaptable for treatment of other phthalocyanine pigments, and may also be usefully employed for developing the tinctorial characteristics of other particulate pigments wherein development is achieved by reduction of the pigment particle size.

Referring first to FIG. 1, a system incorporating the apparatus of the present invention for practice of the present process is diagramatically illustrated. As will be further described, the presently preferred practice of the invention includes repeated impacting of the pigment particles, followed by viscous grinding, boiling, and filtering.

Bagged, bulk crude pigment in crystalline form is introduced into the system at a bulk feed "bag box" at 10. The crude pigment is then conveyed from the bulk feed via a blower 12 or like conveying means to a crude storage silo 14. Before placement of the crude pigment in storage silo 14 for subsequent treatment, ferrous impurities are preferably removed from the crude pigment with magnetic force by passage of the pigment through ferrous material remover 16.

Crude particulate pigment to be treated is removed from the storage silo 14 for passage of the pigment particles through a series of particle-impacting units 18. It is presently contemplated that as many as ten of the impacting units 18 be provided in serial relation for effecting the desired degree of pigment particle size reduction and development. However, it is to be understood that the number of the impacting units 18 through which the particulate pigment is passed can be varied depending upon the configuration of each unit, and the degree of particle size reduction and level of development which is desired.

Figure 2:
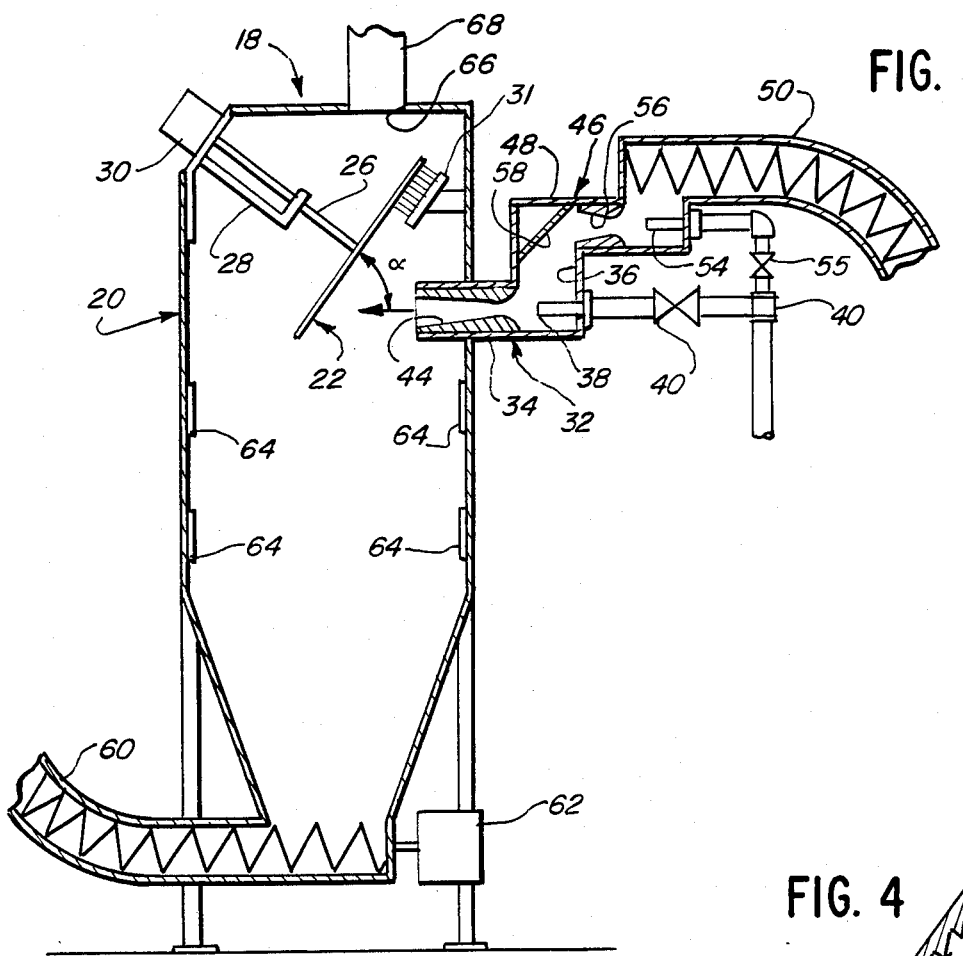
FIG. 2 is a diagrammatic view illustrating a particle-impacting unit in accordance with the present apparatus for practicing the present process.
Figure 4:
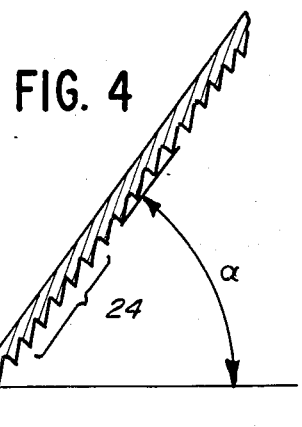
FIG. 4 is a view taken generally along lines 4—4 of FIG. 3 further illustrating the particle impact plate.
Figure 3:
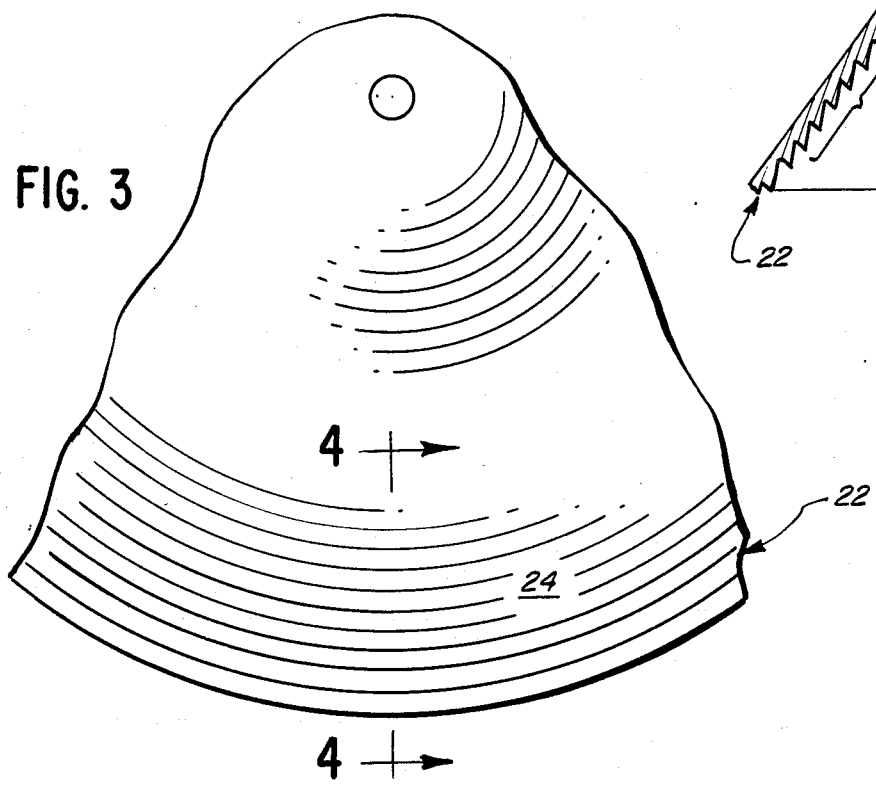
FIG. 3 is a view taken generally along lines 3—3 in FIG. 2 illustrating the impact plate of the particle-impacting unit shown in FIG. 2.

With particular reference to FIGS. 2-4, the configuration of the first one of impacting units 18 will now be described in detail, with the understanding the other of the units 18 may be of substantially identical construction. The unit 18 comprises a containment in the form of a substantially closed, generally vertically oriented impact vessel 20 which may be of substantially cylindrical configuration with inwardly slopping lower inner surfaces.

Positioned within the impact vessel 20 is an impact plate 22 which is preferably of a circular, disk-like configuration. While it will be recognized that the configuration of impact plate 22 can be varied in keeping with the principles of the present invention, it is presently preferred that the impact plate be provided with a stepped impacted surface 24, or a like irregular configuration. As best shown in FIG. 4, the steps of the impact surface 24 are preferably sharply defined, with this configuration being believed to enhance the creation of shear forces attendant to impact of pigment particles thereagainst for effecting size reduction. Fabrication of impact plate 22 from suitably hardened steel has been found to provide the impact plate with sufficient wear-resistance to avoid degradation as a result of high-speed impingement of pigment particles thereagainst.

In order to avoid build-up of pigment particles on the impacted surface of impact plate 22, a presently preferred apparatus desirably includes an arrangement for periodically and automatically cleaning the impact surface. To this end, the impact plate 22 is mounted on a shaft 26 rotatably supported by a suitable support bracket 28 or the like. The shaft 26 is in turn driven by a drive motor 30 which rotates the shaft and impact plate 22 at a relatively low rotational speed, such as on the order of one revolution per minute. The cleaning arrangement further includes a brush 31 mounted within impact vessel 20 so as to contact and clean the impact surface of impact plate 22 as it rotates. The brush 31 is preferably arranged for contacting the surface 24 of impact plate 22 at a position spaced from the portion of the surface against which the pigment particles are directed, thus effecting automatic and continuous cleaning of the impact plate to avoid build-up of particulate pigment thereon.

With further reference to FIG. 2, the particle-entraining assembly 32 of each impacting unit 18 will now be described. Each entraining assembly 32 is desirably straightforward in construction, and is positioned a relatively fixed distance from its respective impact plate 22.

Each entraining assembly 32 includes a generally elongated nozzle body 34 into which opens a feed passage 36 for gravity-feed of particulate pigment into the assembly. The gaseous stream for entrainment of particulate pigment is provided by a pressurized air jet 38 which extends centrally into nozzle body 34. Air jet 38 passes a continuous stream of pressurized air via valve 40 from a suitable pressurized air line 42.

In order to accelerate the particulate pigment for high velocity impact on impact plate 22, the nozzle body 34 of entraining assembly 32 preferably defines a venturi passage 44 positioned in close association with and just downstream of air jet 38. The converging-/diverging configuration of venturi passage 44 has been found to desirably enhance the fluid energy imparted to the particulate pigment for effecting pulverization of the pigment particles as they strike impact plate 22.

Entraining assembly 32 acts to direct the gaseous air stream and substantially all of the particulate pigment entrained therein in a substantially linear path against impact surface 24 of impact plate 22. While some divergence of the air/particle stream naturally occurs, it will be recognized that entrainment and direction of the pigment in this substantially linear manner is distinct from processes which effect pigment particle size reduction by swirling the particles in vortex created within a circular chamber, such as disclosed in U.S. Pat. No. 2,032,827, to Andrews.

Angle "alpha" shown in FIGS. 2 and 4 represents the relative angular disposition of the centerline of nozzle body 34 and a plane generally defined by the impact surface 24 of impact plate 22. Angle "alpha" is preferably an acute angle in the range of approximately 30 degrees to approximately 45 degrees, with an angle of about 37 degrees having proven to be particularly effective. By this configuration, the particulate pigment directed against impact plate 22 impinges thereagainst and falls by gravity toward the bottom of impact vessel 20 for subsequent treatment. In this regard, it will be noted that the entrained particulate pigment is directed against the impact plate 22 such that build-up of the pigment between the "steps" of the stepped impact surface 24 is avoided.

In one current embodiment of the present apparatus, pressurized air on the order of 80 to 100 pounds per square inch is directed through air jet 38, with the air jet having an outlet opening diameter of approximately 5/64 inch. A nozzle body 34 having an overall length of 8 and ⅜ inches has been used with venturi passage 44 being approximately 7 inches in length. While the exact configuration of venturi passage 44 can be widely varied while still effecting the desired acceleration of the particulate pigment, in one current embodiment the inlet diameter of the venturi 44 converges from approximately 9/16 inch to ½ inch over a length of ½ to 1 and ½ inches. The throat of the venturi passage at its minimum diameter is preferably on the order of ½ inch, with the throat having a length from ½ to 1 and ½ inches. The divergent portion of the venturi passage preferably opens to a diameter of approximately ¾ inch.

Careful selection of the relative distance between the end of the nozzle body 34 and the impact plate 22 has been found to provide optimal effectiveness in particle size reduction. In the embodiment described above, a distance of 5 and ⅞ inches has been successfully employed. Experience has shown that if this distance is too great, some of the energy imparted to the particulate pigment is lost, whereas if the distance is too small undesirable backpressure is created within the entraining assembly 32.

With further reference to FIG. 2, the present invention preferably includes an arrangement for separating the crude pigment particles from each other prior to successive treatment of the particles in impacting units 18. To this end, FIG. 2 illustrates a crude particle separator 46 positioned immediately upstream of the entraining assembly 32 of the first one of the impacting units 18. Particle separator 46 is adapted to function by "pre-impacting" the crude particulate pigment prior to entrainment of the particles in the air stream at assembly 32 for effecting particle size reduction. Accordingly, separator 46 includes a body 48 into which the crude particulate pigment is fed from storage silo 14 by way of suitable conveying means, such as auger feed 50 which is driven by motor 52.

A pressurized air jet 54 extends into separator body 48, and thus entrains the crude pigment particles in a gaseous air stream as they fall by gravity from auger feed 50. Because this "pre-impacting" step is for effecting separation of the particulate pigment, with particle size reduction being subsequently effected, the pressurized air supplied via jet 54 is at relatively low pressure, such as on the order of 20 pounds per square inch, with the jet 54 having an outlet diameter on the order of ⅛ inch in a current embodiment.

The separator 46 further preferably includes a venturi passage 56 for imparting fluid energy to the crude pigment particles for subsequent impingement of the particles on a pre-impact plate 58 positioned immediately downstream of venturi passage 56. Satisfactory particle separation has been obtained by positioning pre-impact plate 58 generally at a 45 degree angle with respect to the centerline of venturi passage 56, with the separated pigment particles being subsequently entrained for impact pulverization at assembly 32. The provision of particle separator 46 has been found to assure the smooth flow of particulate pigment through entraining assembly 32 since the crude pigment particles can sometimes have a tendency to stick together because of residues left from solvents and the like employed for their production. The separation of the crude pigment particles thus prevents agglomerated particles from becoming lodged in entraining assembly 32.

With further reference to FIG. 2, the particulate pigment which is directed against impact plate 22 falls therefrom and forms a mass which is held within impact vessel 20 for subsequent treatment. Collection and removal of the particulate pigment from the impact vessel 20 is preferably effected by use of a suitable conveyor, such as auger conveyor 60, which conveys the pigment from the lower portion of impact vessel 20. Auger conveyor 60 is driven by a suitable motor 62, with the particulate pigment thus conveyed to the entraining assembly 32 of the next one of the impacting units 18, or from the last one of the impacting units 18 for storage and/or further treatment. In order to prevent the build-up of the particulate pigment on the inner surfaces of impact vessel 20, a plurality of air vibrators 64 are preferably provided on the inner surface of the vessel 20 for dislodging particulate pigment therefrom.

Because of the positive fluid pressure which is being introduced into each of impact vessels 20 by their respective entrainment assemblies 32, it is necessary that each impact vessel be vented for release of pressure. To this end, each vessel 20 defines a vent opening 66 which communicates with a dust collection system, generally designated 68. The dust collection system not only avoids undesired discharge of particulate pigment into the atmosphere, but further enhances the efficiency of treatment system by permitting recycling of the collected particulate material.

The auger conveyor 60 of the last one of the impacting units 18 delivers the now-reduced particulate pigment to a dry storage silo 70. If desired, magnetic removal of ferrous material can again be effected will ferrous material remover 71 as the pigment is deposited in the storage silo.

At this stage of the treatment, the particle size of the pigment has been significantly reduced, and sufficient "development" of the pigment may have been effected for some applications. However, it is presently contemplated that further development of the pigment can be effected through the use of viscous grinding. To this end, an auger conveyor 72 or like conveying means is provided for transferring the particulate pigment from storage silo 70 to a viscous grinding mixer 74. Notably, this type of double-arm mixer is commonly used in the conventional viscous grinding of particulate phthalocyanine pigment, and thus is readily available for practicing the present invention. Furthermore, the substantial reduction in the salt grinding medium permitted by the previous impact reduction of the pigment particles permits use of existing mixing and processing equipment to produce "batches" of fully developed pigment which provide a much greater effective yield of the pigment itself. This contributes to the cost savings which can be effected through practice of the present process.

The particulate pigment from storage silo 70 is transferred to mixer 74, and combined with measured amounts of the grinding medium, typically microsized salt, and diethylene glycol for forming an amorphous, highly viscous mass ("magma"). Significantly, the quantity of salt combined with the pigment can be selected to have a ratio, by weight, in the range of approximately one-to-one to approximately three-to-one, salt-to-pigment, with a ratio of approximately two-to-one having proven particularly suitable. As will be recognized, the quantity of salt used is far less than in conventional processes wherein ratios of salt-to-pigment typically range from about six-to-one to eight-to-one. Not only is cost savings effected by reduced use of salt, but subsequent filtering and backwashing is facilitated since the quantity of salt in the mixture is so greatly reduced.

Diethylene glycol is added to the particulate pigment and microsized salt, with the glycol acting as a binding agent to form an amorphous, viscous mass. Significantly, the quantity of glycol employed is also much less than the amount usually used in conventional treatment of phthalocyanine pigments. For processing of phthalocyanine blue pigment, glycol is added in a ratio, by weight, in the range of approximately one-to-two to approximately one-to-one glycol-to-pigment, with a ratio of approximately three-to-four having proven effective.

The amorphous mass or magma is mixed until it reaches a temperature of 85 degrees centigrade and is then mixed for four hours while the temperature is not permitted to exceed 95–100 degrees centigrade. For purposes of temperature control, initial mixing may be effected with only a portion of the glycol (for example, 70 percent of the total quantity) with the remainder being added incrementally for controlling the temperature of the mixture. Experience has shown that some temperature control can also be effected by selective mixing of the microsized salt, which is believed to control temperature by affecting the porosity of the mixture. Temperature control by selective, incremental introduction of salt can be desirable in some applications since this salt is generally less expensive than the glycol which is used in the process.

After mixing for approximately four hours (which is significantly less time than the eight to nine hours conventionally required for viscous grinding), hot water is added to the amorphous mass to form a pumpable slurry. The slurry is then transferred to a boiling tank 76 with a pump 78, with the quantity of water added sufficient so as not to exceed a 20 to 25 percent salt solution.

The solution is then boiled for 45 to 60 minutes at 90 degrees centigrade in order to dissolve all of the salt and glycol. Hydrochloric acid is added to the solution to lower the pH to a value of two to three. This acts to dissolve the five to eight percent impurities which typically exist in the crude phthalocyanine pigment.

After boiling, the solution is pumped to a filter press 80 with a pump 82. The filter press captures the particulate pigment, and allows the water to pass through carrying the dissolved salt and glycol. The "press cake" is then backwashed for one-half to one hour (depending on the water pressure used) to wash out the impurities and as much of the remaining salt and glycol as is possible. It is important to note that because of the greatly reduced quantities of salt and glycol employed in the present process, this backwashing step takes significantly less time than the backwashing needed during a conventional phthalocyanine pigment development process. Upon completion of backwashing, the filter press 80 is emptied and the resultant pigment product is ready for subsequent production of printing ink and like media.

Aside from the significant savings in materials, treatment time, and energy usage which can be achieved by development of phthalocyanine pigments in accordance with the present process, tests have shown that the resultant pigment product is of a significant higher quality than that previously obtained in conventional processing. By treating crude green phthalocyanine blue pigment in accordance with the preferred practice of the process as described hereinabove, a pigment product has been obtained having a ten percent higher tinctorial strength than that obtained through conventional treatment. Variations of the process within the general ranges described hereinabove have shown that a pigment product having as much as a forty percent increase in tinctorial strength can be achieved. This means that the same quantity of pigment produces a substantially better color, or that the prior color characteristics can be achieved with ten to forty percent less pigment. Additionally, the resultant product has been found to be "cleaner" and of a more blue shade. Conductivity testing of the resultant product (which is sometimes employed as a measure of its purity) shows that the product obtained through use of the present treatment process is far less electrically conductive than conventionally treated pigment, thus reflecting the greatly reduced residual salt content of the final product.

As noted above, the present invention has been particularly described in connection with treatment of crude green phthalocyanine blue pigment, but it will be understood that the present invention is suited for treatment of other phthalocyanine pigments, such as red shade phthalocyanine blue and phthalocyanine green, and may also be adapted for treatment of other types of particulate pigment wherein the tinctorial characteristics thereof are enhanced by reduction in the pigment particle size.

From the foregoing, it will be observed that numerous modifications and variations of the present invention may be effected without departing from the true spirit and scope of the concept of the present invention. It will be understood that no limitation with respect to the specific embodiment disclosed herein is intended or should be inferred. It is, of course, intended to cover by the appended claims all such modifications as found within the scope of the claims.

What is claimed is:

1. A process for treating particulate pigment for enhancing the tinctorial characteristics thereof for subsequent production of printing media, comprising the steps of:
   providing a containment;
   providing a supply of said particulate pigment;
   entraining said particulate pigment in a gaseous stream;
   directing said gaseous stream and the pigment entrained therein in a substantially linear path against impact means mounted for movement within said containment, whereby said particulate pigment impacts said impact means for reduction in the particle size of said particulate pigment; and
   moving said impact means for periodically cleaning an impact surface thereof with cleaning means positioned within said containment to avoid build-up of particulate pigment thereon.

2. A process for treating particulate pigment in accordance with claim 1, including
   repeating said entraining, directing, and impacting steps for effecting further reduction of the particle size of said particulate pigment.

3. The improved particulate pigment having enhanced tinctorial characteristics produced in accordance with the process of claim 2.

4. A process for treating particulate pigment in accordance with claim 1, wherein
   said directing step includes directing said gaseous stream and entrained particulate pigment at an acute angle relative to the impact surface of said impact means.

5. A process for treating particulate pigment in accordance with claim 1, including
   separating agglomerated particles of said particulate pigment of said supply prior to said entraining step.

6. A process for treating particulate pigment in accordance with claim 5, wherein
   said separating step comprises pre-impacting said particulate pigment against separating means for effecting separation of agglomerated pigment particles from each other.

7. A process for treating particulate pigment in accordance with claim 1, including
   viscously grinding said particulate pigment in the presence of a particulate grinding medium after said impacting step for effecting further reduction of the pigment particle size, and to form an amorphous mass of said pigment and grinding medium.

8. A process for treating particulate pigment in accordance with claim 7, including
   forming a slurry from said amorphous mass by the addition of water, and filtering said slurry to obtain a filtered mass of said particulate pigment.

9. A process for treating particulate pigment in accordance with claim 8, including
   lowering the pH value of said slurry and boiling it prior to said filtering step.

10. A process for producing and developing phthalocyanine pigments of reduced particle size and improved tinctorial characteristics, comprising the steps of:
    providing a containment;
    forming a stream of crude phthalocyanine pigment particles by entrainment in a gaseous stream;
    directing said stream of particles at a high speed against an impact surface positioned within said containment to shatter at least some of said particles to reduce their size and to form a mass of phthalocyanine pigment particles;
    collecting said mass;
    conveying said mass to a further containment;
    forming a stream of said collected mass of phthalocyanine pigment particles by entrainment in another gaseous stream;
    directing said stream of said collected mass at a high speed against a further impact surface positioned within said further containment to shatter at least some of the particles of said mass to further reduce the size of some of the particles of the mass of phthalocyanine pigment particles; and
    repeating said steps of collecting said mass, conveying said mass, forming a stream of said collected mass and directing said stream of said collected mass, until a finally reduced mass of phthalocyanine pigment particles with desired tinctorial characteristics and particulate reduction is achieved.

11. The improved crystalline particulate phthalocyanine pigment as converted from an alpha state to the beta state, and having enhanced tinctorial characteristics and reduced electrical conductivity, and produced in accordance with the process of claim 10.

12. A process for producing and developing phthalocyanine pigments in accordance with claim 10, wherein
each said stream of pigment particles is formed by entraining phthalocyanine pigment particles in a respective air stream at a pressure of about eighty to one hundred pounds per square inch.

13. A process for producing and developing phthalocyanine pigments in accordance with claim 10, including the further step of
viscously grinding said finally reduced mass of phthalocyanine pigment particles in the presence of microsized salt and glycol, then removing said salt and glycol and filtering said phthalocyanine particles to produce phthalocyanine pigments of improved tinctorial strength.

14. A process for producing and developing phthalocyanine pigments in accordance with claim 13, wherein said crude phthalocyanine pigment is green shade phthalocyanine blue pigment.

15. A process for producing and developing phthalocyanine pigments in accordance with claim 14, wherein said step of directing said collected mass is repeated in excess of five times to produce said finally reduced mass of phthalocyanine particles.

16. A process for producing and developing phthalocyanine pigments in accordance with claim 13, wherein
the microsized salt is present in a weight ratio of from about one-to-one to about three-to-one parts salt to pigment, and said glycol is present in a weight ratio of about one-to-one to about one-to-two parts glycol to pigment.

17. A process for producing and developing phthalocyanine pigments in accordance with claim 16, wherein said crude phthalocyanine pigment is green shade phthalocyanine blue pigment.

18. A process for producing and developing phthalocyanine pigments in accordance with claim 17, wherein said step of directing said collected mass is repeated in excess of five times to produce said finally reduced mass of phthalocyanine particles.

19. The improved crystalline particulate phthalocyanine pigment as converted from an alpha state to the beta state, and having enhanced tinctorial characteristics and reduced electrical conductivity, and produced in accordance with the process of claim 18.

20. The improved crystalline particulate phthalocyanine pigment as converted from an alpha state to the beta state, and having enhanced tinctorial characteristics and reduced electrical conductivity, and produced in accordance with the process of claim 13.

21. A process for treating particulate phthalocyanine pigment for subsequent production of printing media, comprising the steps of:
providing a supply of said particulate pigment;
providing a containment;
entraining said particulate pigment in a gaseous stream;
directing said gaseous stream and the pigment entrained therein against impact means positioned within said containment in a substantially linear path against an impact surface of said impact means so that said particulate pigment impacts the surface of said impact means for reduction in the particle size of said particulate pigment;
collecting said particulate pigment at a lower portion of said one containment, and mechanically conveying the collected pigment to a further containment;
entraining said collected pigment in a further gaseous stream,
and directing said further gaseous stream and said collected pigment against a further impact surface of a further impact means positioned within said another containment for further reduction in the particle size of said particulate pigment; and
repeating said steps of collecting said pigment, conveying the collected pigment, entraining the collected pigment, and directing the collected pigment for effecting further reduction in the particle size of said particulate pigment to increase the tinctorial strength thereof, including periodically cleaning the impact surface of the impact means respectively positioned within each said containment with a plurality of cleaning means respectively positioned within said containments to avoid the build-up of particulate pigment of the impact surfaces of the impact means.

22. A process for treating phthalocyanine pigment in accordance with claim 21, wherein
said steps of directing said pigment each comprises directing said gaseous stream and pigment entrained therein against one of said impact means at a generally acute angle relative to the respective impacted surface in the range of approximately 30 degrees to approximately 45 degrees.

23. A process for treating phthalocyanine pigment in accordance with claim 22, including
viscously grinding said particulate pigment in the presence of a grinding medium after the last one of said directing steps for effecting further reduction of the pigment particle size, and to form an amorphous mass of said pigment and grinding medium.

24. A process for treating phthalocyanine pigment in accordance with claim 23, wherein
said grinding step includes grinding said particulate pigment in the presence of a particulate grinding medium comprising a salt combined with said pigment in a ratio, by weight, in the range of approximately one-to-one to approximately three-to-one, salt-to-pigment.

25. A process for treating phthalocyanine pigment in accordance with claim 24, wherein
said grinding step includes combining glycol with said particulate pigment and said salt in a ratio, by weight, in the range of approximately one-to-two to approximately one-to-one, glycol-to-pigment.

26. The improved crystalline particulate phthalocyanine pigment as converted from an alpha state to the beta state, and having enhanced tinctorial characteristics and reduced electrical conductivity, and produced in accordance with the process of claim 24.

27. A process for treating phthalocyanine pigment in accordance with claim 23, including
forming a slurry with said amorphous mass by the addition of water, raising the pH of said slurry by the addition of an acid, boiling the resultant mixture for dissolution of impurities, and filtering the mixture to obtain a mass of said particulate pigment.

* * * * *